United States Patent [19]
Smith

[11] 3,739,831
[45] June 19, 1973

[54] DEVICE FOR REMOVING HEAVY DUTY TIRES FROM WHEELS

[76] Inventor: Vernon L. Smith, P. O. Box 354, Burkburnett, Tex. 76354

[22] Filed: Aug. 16, 1971

[21] Appl. No.: 171,947

[52] U.S. Cl. ............................................. 157/1.28
[51] Int. Cl. ........................................... B60c 25/06
[58] Field of Search ................ 157/1.17, 1.2, 1.26, 157/1.28, 1.33

[56] References Cited
UNITED STATES PATENTS

| | | | |
|---|---|---|---|
| 2,518,126 | 8/1950 | Daw et al. | 157/1.2 |
| 2,418,849 | 4/1947 | Polt | 157/1.28 X |
| 2,595,258 | 5/1952 | Hildred | 157/1.2 |
| 2,762,424 | 9/1956 | Zito | 157/1.2 X |
| 2,832,400 | 4/1958 | Laughlin | 157/1.28 |

*Primary Examiner*—Granville Y. Custer, Jr.
*Attorney*—Wayland D. Keith

[57] ABSTRACT

A tire removing device comprising upper and lower frames to receive a tire and wheel therebetween, so that selected rings may be positioned on the adjacent faces of the frames, one of which rings engages the side of the tire and the other of which engages the removable side ring of a wheel. A hollow jack is positioned on the face of the upper frame. A screwthreaded rod is positioned through the hollow jack and through a slotted plate on the upper frame, which rod is anchored to a screwthreaded nut on the lower frame. An abutment on the rod, such as a nut, abuts with the upper face of the jack plunger, so upon extending the plunger, the frames will be moved together, with one of the rings on the frame engaging a side of the tire adjacent the side rim thereof and the other of the rings engaging a side ring of the wheel so as to urge the side ring and the tire towards each other to enable the lock ring on the wheel to be removed, and the subsequent removal of the tire.

2 Claims, 3 Drawing Figures

PATENTED JUN 19 1973

3,739,831

INVENTOR.
VERNON L. SMITH
BY
Wayland D. Keith
HIS AGENT 3,739,831

DEVICE FOR REMOVING HEAVY DUTY TIRES FROM WHEELS

SUMMARY OF THE INVENTION

The present device is used primarily for removing heavy duty tires from wheels which have a side ring and a lock ring, such as the "Budd" type wheels, the beads of which tires and the rim upon which they are fitted often become corroded and therefore stick.

The present tire removing device is so constructed that extremely great pressure can be applied, by a jack, directly to the movable side ring on the wheel and to the tire adjacent the out-turned rim so as to move both beads of the tire toward each other, thereby to enable the removal of the lock ring from the wheel, whereupon the pressure on the jack is released and a screwthreaded rod or shaft may be quickly removed which enables a spring on the pivot member to lift the upper frame and jack so it may be swung to either side, clear of the tire and wheel, to enable the tire and wheel to be removed, repaired and replaced in a conventional manner.

The frames of the device are made primarily of tubular material, which enables a light weight device to be made, which is relatively strong and which may be readily moved from place to place.

Further provision is made to accommodate different size rings to fit the respective upper and lower frames, to enable different size tires and wheels to be acted upon. The upper frame is movable longitudinally with respect to the lower frame and the jack support as the plate on the upper frame is slotted so as to enable the hollow jack to be located over a screw-threaded anchor nut in the lower frame, when a tire and a wheel are moved into place. Whereupon, the upper frame may be swung back into place to enable the screwthreaded rod to align with the screwthreaded anchor nut on the lower frame. The compression spring, which is on the pivot member, is interposed between the upper and lower frames, and counterbalances the upper frame so a minimum of energy is expended to move the frame above the wheel and tire and to a side thereof.

BACKGROUND OF THE INVENTION

Various jack actuated devices have been proposed heretofore for removing tires from wheels, but these, for the most part, had a considerable number of intricate working parts to be adjusted. The present device is so constructed that a minimum of adjustment and a minimum of effort is required to remove the tires from wheels of different sizes.

OBJECTS OF THE INVENTION

An object of this invention is to provide a tire removing device for removing tires from wheels, which wheels utilize a side ring and a lock ring, which device will urge the two beads of the tire towards each other to enable ready removal of the lock ring and the tire.

Another object of the invention is to provide a tire removing device that may be placed at floor level so the tire may be rolled thereonto without the tire having to be lifted to a higher level.

A further object of the invention is to provide a pair of frames, with detachable rings thereon, to fit against the side of the tire and the side ring of the wheel to enable the removal of the lock ring and tire from the wheel, the upper of which frames may be moved arcuately from over the lower frame after the pull rod has been removed from the jack.

Still a further object of the invention is to provide a device having a pair of frames to exert pressure on the tire and a side ring of a wheel, which device utilizes a hollow fluid actuated jack and a quickly attachable and detachable threaded rod that interlocks the two frames for quick attachment and removal of the device in the removal of the lock ring and the tire.

Yet a further object of the invention is to provide a device that is simple in construction, easy to operate, relatively inexpensive to build, that is sturdy in construction, and will operate over a long period of time with a minimum of maintenance.

BRIEF DESCRIPTION OF THE DRAWING

With these objects in mind and others which will become manifest as the description proceeds, reference is to be had to the accompanying drawing in which like reference characters designate like parts in the several views thereof, in which.

DESCRIPTION OF THE PREFERRED EMBODIMENT

Figures 1, 2, 3:
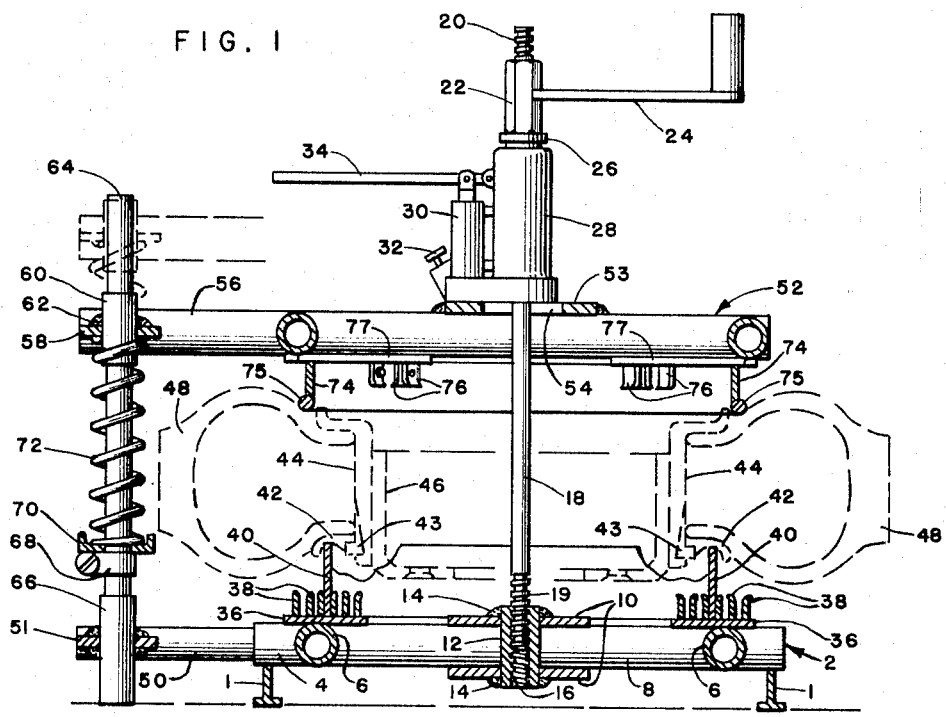
FIG. 1 is a sectional view, partly in elevation, of the tire removing device taken on line 1—1 of FIG. 2, looking in the direction indicated by the arrows, with portions shown in elevation and in dashed outline to bring out the details of construction.
FIG. 2 is a top plan view of the tire removing device, with portions broken away and with portions shown in dashed outline and shortened to bring out the details of construction.
FIG. 3 is an enlarged fragmentary, detailed view taken on line 3—3 of FIG. 2, looking in the direction indicated by the arrows.

With more detailed reference to the drawing, the numeral 1 designates generally a base comprising a pair of transverse inverted T members secured to the lower side of a tubular frame 2. The frame 2 has longitudinal tubular members 4 on each side thereof, with transverse tubular members 6 positioned therebetween and being interconnected with the longitudinal tubular members, as by welding. Further longitudinal tubular members 8 are positioned in spaced apart relation near the center of frame 2 and are secured to transverse tubular members 6, as by welding. Plates 10 are positioned mediate the length of the further longitudinal tubular members 8 and are preferably welded thereto, to which members 8 an elongated nut 12 is secured, as by welding, as indicated at 14. The nut is preferably screwthreaded with threads such as acme threads 16 to threadably receive the lower end of a shaft or rod 18. The upper end of the rod 18 is screwthreaded, as indicated at 20, to threadably engage an elongated, screwthreaded nut 22 to which nut 22 a crank 24 is secured. This enables the tightening of nut 22 against the upper face 26 of the plunger of a hollow jack 28. The jack, in the present instance, is shown to be a hydraulic jack with a pumping arrangement 30, a control valve 32 and a handle 34 to operate the pump 30. While the jack is shown to be a hydraulic jack, any type of jack, either hydraulic or mechanical, may be used so long as the rod or shaft 18 extends therethrough to enable a longitudinal pull to be exerted on rod or shaft 18.

The frame 2 has circumferentially spaced apart plates 36 thereon, which plates have pairs of upstanding lugs 38 thereon, which lugs receive a ring 40 therein, as will best be seen in FIGS. 1 and 2. The ring 40 is adapted to engage a side ring 42 which surrounds the rim 44 and is held in place on wheel 46 by lock ring 43, which ring 42 holds the tire 48 on wheel 46.

The ring 40 is held in spaced radial relation with respect to rod or shaft 18, so upon putting wheel 46 upon ring 40, it will be substantially centered with respect to frame 2. The frame 52 slidably mounts on a pair of tubular members 50 which are interconnected by a plate 51, to enable the frame 52 to be moved longitudinally of frame 2, so, upon varying the sizes of wheels 46, the frame 52 may be shifted longitudinally of frame 2 and the rod 18 may be shifted within slot 54, formed in plate 53, to compensate for any variation in the diamter of wheel 46. The plate 53 is welded to frame 52, as will best be seen in FIGS. 1 and 2.

The frame 52 is constructed in a manner somewhat similar to the construction of frame 2, except, an elongated portion 56 of frame 52 has a transverse plate 58 therein which has a tubular sleeve 60 welded thereto, as indicated at 62. The sleeve 60 is slidably mounted on an upright shaft 64 to permit relative vertical sliding movement of frame 52 with respect to frame 2. For convenience in shipping and storage, the shaft 64 is slidably fitted within a tubular member 66, which tubular member is welded to plate 51, which tubular member serves as a support leg for sliding portion 50 of frame 52. The shaft 64 has a clamp 68 therearound to support a cupped member 70, upon which cup a compression spring 72 is mounted, which compression spring extends upward and is seated against plate 58. The spring 72 is of such strength that when the jack 28 and screwthreads 20 of bar 18 are released from nut 22 or the screwthreads 19 on the shaft 18 are released from the threads 16 in the nut 12, the frame 52 and jack 28 will be moved upward by spring 72 so that the frame 52 may be pivotally moved about shaft 64 as an axis to either side of the tire 48, to enable the wheel 46 and tire 48 to be removed from the lower frame 2 and another tire put in place.

An upper ring 74 has a round rod 75 welded on the lower side thereof to engage the side of the tire, with the upper portion of ring 74 engaging pairs of lugs 76 secured to circumferentially spaced plates 77 on frame 52, which lugs have axially aligned holes 78 therein which are adapted to register with at least a pair of holes 80 in ring 74 to receive pins 82 therethrough so as to support the desired size ring 74 above tire 48.

OPERATION

The tire break down and removing device is preferably seated on a smooth floor surface, so a tire may be placed thereon with a minimum of physical effort, and with the upper frame 52 swung about the axis of upright shaft 64 so as to enable the wheel 46, on which tire 48 is mounted, to be laid in a horizontal position upon ring 40, which ring is fitted between circumferentially spaced pairs of upstanding centering lugs 38, as will be evident in FIGS. 1 and 2. With the removable side ring 42 of the wheel fitted on the upper face of ring 40, as shown in FIG. 1, the upper frame 52 is swung about the axis of upright shaft 64 until the center of jack 28, which has a vertical axial hole (not shown) formed therethrough, is over a screwthreaded nut 12, which is secured to plates 10 on the lower frame 2. Whereupon, the screwthreaded rod or shaft 18 is passed through the vertical hole in jack 28 so that the threads 19 will engage threads 16 and the crank 24, which is secured to an elongated nut 22, threadably engages threads 20 on upright rod or shaft 18. A few turns of the crank 24 will bring the lower end of the nut 22 into engagement with the upper face of plunger 26 of the jack 28. Then, with the air released from the tire 48, and with the valve 32 of jack 28 closed, so oil will be withdrawn from the reservoir of the jack and directed beneath the plunger 26, tension will be exerted on rod 18 which will cause the jack 28 and frame 52 to move downwardly.

The lower round portion 75 of upper ring 74 comes into bearing engagement with the side wall of tire 48 adjacent the outer periphery of the rim 44 of wheel 46, and with the ring 40 on the lower frame in engagement with the side ring 42 of the wheel a continued operation of the handle 34 of jack 28 will cause the upper frame 52 to move downwardly against tension of spring 72, and with the side ring 42 and both beads of the tire 48 pushed inwardly by rings 40 and 74, these tire beads and ring 44 will stay in this position. The tire is removed from the breakdown device and turned over onto a flat surface, with the lock ring 43 exposed, to be removed in the conventional manner, such as with a tire tool or a screw driver. Upon removal of the lock ring 43, the side ring 42 and tire 48 may be readily removed, by hand, from the rim 44 of the wheel 45.

The upper ring 74 is suspended by a pair of pins 80 passing through diametrically opposed holes in ring 74 and through holes 78 in pairs of downwardly extending lugs 76. In this manner different size rings may be used to accommodate different size tires and although there are four sets of downwardly extending lugs to properly center the ring 74 with respect to the upper frame 52, the two pins 80 will properly support the ring and will enable the rings to be removed and a smaller or larger size ring to be fitted between the pairs of lugs 76, as hereinbefore set out.

The tubular members 50 slide into the lower frame 2 in accordance with the size of tire being operated upon and in so doing the jack 28 and shaft 18 will be moved in slot 54 so that the shaft will center over nut 12 on frame 2. The tire removing device may be readily disassembled by unscrewing the rod or shaft 18 from nut 12 and removing this from jack 28, then removing the jack from the upper face of plate 53. Then by sliding frame 52 upward on upright shaft 64, the upper frame may be removed, and since the shaft 64 is loosely positioned wtihin tubular member 66, the shaft may be removed and the entire device may be packaged in a relatively small package for storage or shipment.

What is claimed is:

1. A device for demounting a tire from a wheel, which wheel has a demountable side ring and a lock ring thereon, which device comprises;
   a. a first frame,
   b. a second frame,
   c. a first ring mounted on said first frame and extending toward said second frame,
      1. said first ring on said first frame being detachably connected thereto,
   d. a second ring mounted on said second frame and extending toward said first ring,
      1. said second ring on said second frame being detachably connected thereto, 2. the tire and wheel adapted to be positioned between said first and second rings on said respective frames so one of the rings on one of said frames will be brought into bearing engagement with the side wall of the tire and the other ring on the other of said frames will be brought into engagement with the demountable side ring on the wheel,
3. each said frame has pairs of inwardly extending lugs spaced circumferentially therearound to detachably receive said respective rings associated with said respective frames, e. a jack mounted on said second frame, f. a rod anchored to one of said frames and extending through the wheel and the other of said frames and being engageable with said jack, g. fastening means on the first frame to secure said rod against longitudinal movement relative thereto, and h. abutment means on the opposite end of said rod to engage a movable portion of said jack to enable a longitudinal pull to be exerted on said rod to urge said frames on which said rings are mounted toward each other to loosen the movable side ring of the wheel to enable same to be removed prior to the removal of the tire.

2. A device for demounting a tire from a wheel, which wheel has a demountable side ring and a lock ring thereon, which device comprises;

a. a first frame, b. a second frame, c. a first ring mounted on said first frame and extending toward said second frame, d. a second ring mounted on said second frame and extending toward said first ring, 1. the tire and wheel adapted to be positioned between said first and second rings on said respective frames so one of the rings on one of the frames will be brought into bearing engagement with the side wall of the tire and the other ring on the other of said frames will be brought into engagement with the demountable side ring on the wheel, e. a jack mounted on said second frame, f. a rod anchored to one of said frames and extending through the wheel and the other of said frames being engageable with said jack, g. fastening means on the first frame to secure said rod against longitudinal movement relative thereto, h. abutment means on the opposite end of said rod to engage a movable portion of said jack to enable a longitudinal pull to be exerted on said rod to urge said frames on which said rings are mounted toward each other to loosen the movable side ring of the wheel to enable same to be removed prior to the removal of the tire, i. said first frame being horizontal, j. said first frame has a shaft upstanding therefrom, 1. a spring surrounding said shaft, k. said second frame has a sleeve mounted thereon, which sleeve is complementary to the axis of said upstanding shaft, and 1. an abutment formed on said sleeve and secured to said second frame, so said spring will support said second frame in pivotal relation above the tire and wheel when in one position.

* * * * *